(12) United States Patent
Bertrand et al.

(10) Patent No.: US 11,718,339 B2
(45) Date of Patent: Aug. 8, 2023

(54) METHOD FOR MANUFACTURING A VEHICLE STEERING WHEEL

(71) Applicant: Autoliv Development AB, Vargarda (SE)

(72) Inventors: Olivier Bertrand, Courcome (FR); Jonathan Pinaud, Montamise (FR); Hugues Doursoux, Latille (FR); Agnes Quintard, Lezay (FR)

(73) Assignee: Autoliv Development AB, Vargarda (SE)

( * ) Notice: Subject to any disclaimer, the term of this patent is extended or adjusted under 35 U.S.C. 154(b) by 597 days.

(21) Appl. No.: 16/645,157

(22) PCT Filed: Sep. 6, 2018

(86) PCT No.: PCT/EP2018/073986
§ 371 (c)(1),
(2) Date: Mar. 6, 2020

(87) PCT Pub. No.: WO2019/048538
PCT Pub. Date: Mar. 14, 2019

(65) Prior Publication Data
US 2021/0354743 A1 Nov. 18, 2021

(30) Foreign Application Priority Data
Sep. 6, 2017 (FR) ...................................... 1758210

(51) Int. Cl.
*B62D 1/06* (2006.01)
*B21H 1/02* (2006.01)
(Continued)

(52) U.S. Cl.
CPC ................. *B62D 1/06* (2013.01); *B21H 1/02* (2013.01); *B21K 1/28* (2013.01); *B29C 53/04* (2013.01);
(Continued)

(58) Field of Classification Search
None
See application file for complete search history.

(56) References Cited

U.S. PATENT DOCUMENTS

2017/0166116 A1 6/2017 Asakawa et al.
2019/0016383 A1* 1/2019 Spencer ................ B60Q 3/283

FOREIGN PATENT DOCUMENTS

WO 2017/116898 A1 7/2017

OTHER PUBLICATIONS

International Search Report of the International Searching Authority for PCT/EP2018/073986 dated Nov. 22, 2018.
(Continued)

*Primary Examiner* — Barbara J Musser
(74) *Attorney, Agent, or Firm* — Foley & Lardner LLP (57) ABSTRACT

A method for manufacturing a vehicle steering wheel, the steering wheel comprising: —a rim, —an outer sheath formed by at least one strip attached around at least one part of the rim, —at least one device passing through the outer sheath, the method comprising at least the following steps: —positioning the strip around the rim, —attaching the strip to the rim in order to form the outer sheath, —forming an opening in the outer sheath facing an internal part of the device, —folding portions of the outer sheath towards the inside of the rim.

13 Claims, 4 Drawing Sheets

(51) Int. Cl.
*B21K 1/28* (2006.01)
*B29C 65/00* (2006.01)
*B29C 65/48* (2006.01)
*B29C 53/04* (2006.01)
*B21H 1/06* (2006.01)
*B21K 1/34* (2006.01)
*B29C 45/17* (2006.01)
*B29L 31/30* (2006.01)

(52) U.S. Cl.
CPC .............. *B29C 65/00* (2013.01); *B29C 65/48* (2013.01); *B21H 1/06* (2013.01); *B21K 1/34* (2013.01); *B29C 65/002* (2013.01); *B29C 2045/1721* (2013.01); *B29L 2031/3047* (2013.01); *B60Y 2410/114* (2013.01); *B60Y 2410/123* (2013.01); *Y10T 29/49488* (2015.01)

(56) References Cited

OTHER PUBLICATIONS

English translation of International Search Report of the International Searching Authority for PCT/EP2018/073986 dated Nov. 22, 2018.

* cited by examiner

METHOD FOR MANUFACTURING A VEHICLE STEERING WHEEL

This invention relates broadly to a method for manufacturing or assembling a vehicle steering wheel, and in particular a method for manufacturing or assembling a vehicle steering wheel sheathed with an outer sheath around a rim and comprising a device having a part underneath the outer sheath and a part on the surface of the rim covered by the outer sheath.

Document US20160025281 discloses a steering wheel with a rim covered by an outer sheath that is open to allow the passage of a light guide, but the fitting of such a sheath with an opening from a strip may cause wrinkling problems when attaching (typically by seaming) the strip around the rim, which will create non-conformities and will significantly decrease the perceived quality.

One purpose of this invention is to overcome the above-mentioned drawbacks of the prior art, and in particular, first of all, to propose a method for manufacturing a steering wheel comprising a rim with an outer sheath around the rim, and comprising a device passing through the outer sheath, the method making it possible to avoid the formation and presence of wrinkles, while providing the steering wheel with a neat and well-finished final appearance at the rim area between the device and the outer sheath.

To that end, a first aspect of the invention relates to a method for manufacturing a vehicle steering wheel, the steering wheel comprising:

a rim, an outer sheath formed by at least one strip attached around at least part of the rim, at least one device passing through the outer sheath, the method comprising at least the following steps:

positioning the strip around the rim, attaching the strip to the rim to form the outer sheath, forming an opening in the outer sheath facing an internal part of the device, folding portions of the outer sheath surrounding the opening towards the inside of the rim to form flaps and provide access to the inner part of the device. Thus, the method comprises a step that consists of forming an opening (a slit, a hole, an indentation) in the outer sheath already installed and attached to the steering wheel. This makes it possible to tension and easily attach the strip to the rim, as the opening is not yet formed. The folding or refolding of the portions of the outer sheath to form flaps or flanges or over-extensors ultimately makes it possible to finalize the assembly of the device passing through the outer sheath, by freeing access to the inner parts or to assemble an external or visible part.

Advantageously, the step consisting of forming an opening in the outer sheath comprises a step consisting of opening a slit previously formed in the strip, and kept closed by temporary closure means fitted prior to the step of positioning and attaching the strip around the rim. According to this embodiment, the opening is already present in the strip before its assembly on the rim, but to facilitate manufacture, temporary closure means are provided, to prevent the opening from stretching and to be able to handle and tension a strip in one piece when it is fixed around the rim. In other words, the slit is formed prior to fitting to the rim, and the method comprises a step consisting of fitting the temporary closure means prior to fitting the strip to the rim.

Advantageously, the method comprises, prior to the step of positioning and attaching the strip, a step consisting of forming the slit in the strip laid flat. Manufacturing is more accurate and easier when forming the opening on the strip laid flat: it is possible to consider cutting the slit at the same time as cutting the external contours of the strip, for example.

Advantageously, the method comprises, prior to the step of positioning and attaching the strip, steps consisting of forming the slit in the strip laid flat and closing the slit (for example by joining the two sides of the slit edge-to-edge) with the temporary closure means, such as a slide fastener, temporary seam, or adhesive means. The purpose of the temporary closure means is to prevent the opening from stretching when the strip is fixed around the rim (for example by seaming) and they must be easily removable during manufacture, once the strip is fitted and attached to the rim, thus forming the outer sheath.

Advantageously, the step consisting of forming an opening in the outer sheath comprises a step consisting of cutting a slit in the outer sheath after the step of positioning and attaching the strip around the rim. According to this embodiment, the opening is formed in the strip only after the strip has been positioned and attached to the steering wheel, thus forming the outer sheath. In other words, the strip is cut out once it has been placed on the steering wheel. Cutting can be done manually or automatically.

Advantageously, the method comprises a step consisting of positioning a protective element on the device prior to the step of positioning and attaching the strip around the rim. The protective element can be removed if necessary after opening the slit. This makes it possible to avoid any risk of damage, by a cutting tool, to any element located underneath the sheath at the opening.

Advantageously, the method comprises, prior to the step of positioning and attaching the strip, a step of mounting a protruding element on the rim, to temporarily increase a rim perimeter at least during the step of positioning and attaching the strip and/or cutting the slit. In other words, the protective element is a protruding element, and the step of positioning the protective element allows temporarily increasing a rim perimeter at least during the step of positioning and attaching the strip and/or cutting the slit. The protective or protruding element assists in mounting the strip on the rim, making it possible to tension the strip to be fitted, to ensure a wrinkle-free installation and ensure that there is sufficient material to form sufficiently long flaps. The section of the rim that is sheathed and equipped with the protruding element has a larger surface area than the final rim section, when the protruding element has been removed and the steering wheel is ready for use. Indeed, since sufficient material must be provided at the base strip to form the flaps or flanges at the edges of the final opening, this can cause wrinkles during manufacture and slow installation. The added element makes it possible to tension these wrinkles and prevent them from appearing. In addition, this makes it easier to position the strip around the rim, especially for steering wheels where half the width of the final opening is less than the flap length required to ensure a good finishing of the steering wheel. Advantageously, the protruding element is positioned facing an internal part of the device. Furthermore, the protruding element forms a protective element, as it forms a shield between the rest of the device located inside the rim and the outer sheath that will be cut (with a sharp cutting tool).

In other words, one aspect of the invention relates to a method for manufacturing a vehicle steering wheel, the steering wheel comprising:

a rim, an outer sheath formed by at least one strip attached around at least part of the rim, at least one device passing through the outer sheath, the method comprising at least the following steps:

positioning a protective or protruding element on the rim,
positioning the strip around the rim,
attaching the strip to the rim to form the outer sheath,
forming an opening in the outer sheath facing an internal part of the device,
removing the protective or protruding element through the opening formed,
folding portions of the outer sheath towards the inside of the rim to form flaps and provide access to the inner part of the device.

This embodiment allows forming a groove in the outer sheath once the flaps or flanges have been folded down, and each flap or flange has a length greater than half the width of the final opening or groove, since the protruding element increased the rim perimeter when the strip was attached to the steering wheel (for example by seaming and/or gluing), before the opening was formed. Such overlengths allow an attractive final appearance to be achieved on the steering wheel, even if the final groove is narrow. In particular, such a method makes it possible to obtain a steering wheel with a groove width of 6 mm or less, and overlengths of strip allowing flaps or flanges each 4 mm or more in length.

Advantageously, the protective element or protruding element comprises a cutting guide groove, and the method comprises a step consisting of cutting the outer sheath by following the guiding groove with a cutting tool. Such a guiding groove allows the cutting operation to be made secure, by forming a cutting line to be followed. Such a groove can also provide a visual aid for the cutting operation as it can be seen through the outer sheath.

Advantageously, the method comprises a step consisting of removing the protective or protruding element, before folding the flaps towards the inside of the rim. This embodiment allows space to be freed up for inserting a steering wheel component that is part of, or interacts with, the device passing through the outer sheath.

Advantageously, the method comprises a step consisting of positioning a guiding tool on the steering wheel before cutting the slit in the outer sheath. Such a guiding tool, placed and positioned in reference onto the steering wheel (its hub and/or its spokes), makes it possible to efficiently guide a cutting tool to follow the cutting line exactly, without any risk of slipping or deviation in cutting.

Advantageously, the step consisting of folding the flaps consists of forming an access groove towards the internal part of the device passing through the sheath. Folding or refolding the flaps or overlengths against walls towards the inside of the steering wheel makes it possible to form a neat and aesthetic groove which can then accommodate a component or allow light to pass through for example.

Advantageously, the method comprises a step consisting of inserting a cover or screen into the previously formed opening.

Advantageously, the step consisting of attaching the strip around the rim comprises a step consisting of attaching two opposite ends of the strip to the rim, or to each other. In particular, the step consisting of attaching the strip around the rim comprises a step consisting of gluing at least one of the ends by adhesion to the rim, and then a step consisting of attaching two opposite ends of the strip to the rim, or to each other. It should be noted that during this step and at the opening which will subsequently be formed in the outer sheath, the strip is not adhered to the rim or to any element located underneath the outer sheath to which it is not to be attached in order to fold down the portions of the outer sheath surrounding the opening, since the opening is not formed and cannot be stretched out.

Advantageously, the step consisting of attaching the strip around the rim comprises a step consisting of seaming the strip. A seaming step requires a taut strip. The method according to the invention provides such a strip without an opening that stretches, since the step consisting of opening the slit or opening is carried out after this seaming step.

Alternatively, the step consisting of attaching the strip around the rim comprises a step consisting of gluing the strip to itself, or to the rim.

Advantageously, the step consisting of folding the flaps comprises a step consisting of attaching the flaps to walls of the steering wheel. The position of the flaps or flanges is secured and can be guaranteed by gluing, for example.

However, it is advantageous not to use glue on the right side of the flaps, in order to limit non-conformities in perceived quality (if glue spills over a visible part, as typically the glue application process is manual and the use of a brush does not allow the glue to be applied in a very precise way).

In addition, the use of reusable tools or assembly parts that must be reusable may be intended. For this purpose, these reusable tools or parts must not be contaminated with glue. First of all, chemical incompatibilities between the glue and these reusable tools or parts can be expected (an element made of plastic, polypropylene, polyamide or polyethylene may not be compatible with certain water-based glues or solvent-based glues, and/or those containing a hardener, which makes it easy to wipe off a trace of glue). Typically, the protruding element or guiding tool are made of polypropylene when the adhesive is a water-based glue or a solvent-based glue. As an option, it is possible to glue the entire surface of the sheath to the rim, with the exception of the flaps, to further reduce the risk of burrs or glue spillage on reusable tools or components. The flaps can very well be held in position by mechanical means.

A second aspect of the invention relates to a steering wheel comprising an outer sheath, a rim and a device, assembled according to the first aspect.

Advantageously, a gap between the flaps (folded down, i.e. folded and fixed towards the inside of the rim) forms a groove of a predetermined width, and the flaps each have a length greater than half the predetermined width.

Advantageously, the predetermined width of the groove is less than or equal to six millimeters.

Advantageously, the flaps each have a length greater than or equal to 4 mm.

A third aspect of the invention relates to a motor vehicle comprising a steering wheel according to the second aspect.

Other features and advantages of the present invention will be seen more clearly from the following detailed description of an embodiment of the invention provided by way of a non-limiting example and illustrated by the appended drawings, wherein.

Figure 4:
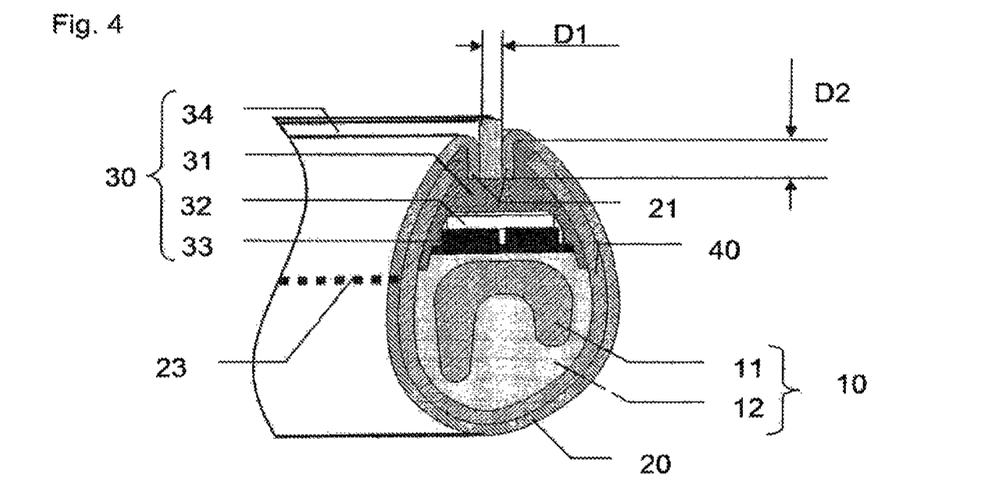

FIG. 4 is a cross sectional view of a rim of the steering wheel after assembly is completed. The rim comprises:
- a frame 11 (made of metal, such as aluminum or magnesium),
- an overmolding material 12 (for example polyurethane, also called foam or foamed material), overmolded around frame 11 to form a support 10,
- an outer sheath 20 (typically of natural or artificial leather, but other materials are possible), attached to the rim by an edge-to-edge seam 23,
- an electrical element 40 such as a heating mat or a proximity sensor,
- a device 30 passing through the outer sheath, to send light signals to the driver.

Indeed the device 30 comprises an electronic circuit (a printed circuit 32 fixed on the support 10, with embedded light sources (light-emitting diodes for example), a lower fixing interface 33, an upper fixing interface 31 (which may be transparent or locally pierced to allow light through) and a light guide 34, to be able to illuminate part of the steering wheel rim, so as to improve the ergonomics or man-machine interface of the vehicle.

It is therefore necessary to go through the outer sheath 20 to send the light signals to the driver from elements arranged on the support 10 and underneath the outer sheath 20. However, the outer sheath 20 is typically made from a strip of material (or several strips of material) which must, during assembly, be attached around the rim, typically by a seam 23, but other methods of attachment may be used or combined with this, such as gluing, in particular.

When fixing the strip to form the outer sheath 20, it is important not to form wrinkles, which are visual defects to be avoided so as not to affect the quality perceived by the consumer. Considering that an opening in the outer sheath 20 is necessary to allow the light through, the invention proposes a method for manufacturing the steering wheel that avoids the formation of wrinkles (despite an opening that could stretch), while allowing a neat, facilitated assembly and with an attractive final appearance for the light guide 34.

Indeed, the light guide 34 is visible to the driver, as well as its edges and even the edges of the outer sheath 20, represented by flaps or flanges 21 folded towards the inside of the rim, and adjacent to the edges of the light guide 34. It is therefore important to provide sufficient length to form and neatly fold the flaps or flanges 21. In particular, the invention provides a method that ensures a sufficient length of flange, even if the groove 22 which receives the light guide 34 is narrow.

To this end, the invention proposes, in summary, to fit and fix a plain and continuous strip around the rim, to attach it and only then to form the opening for the light guide 34, in order to then be able to fit the light guide 34 facing the inner part of the device 30 which generates light.

Figure 1:
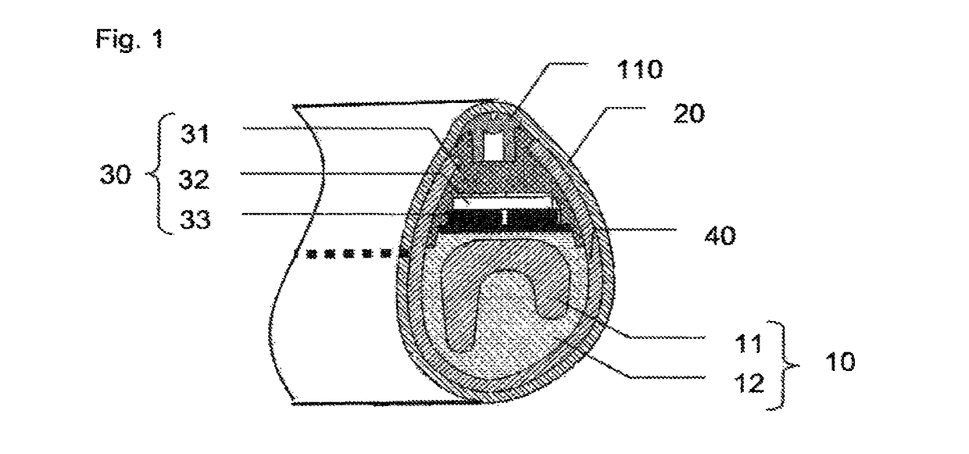
FIGS. 1 to 4 are cross sectional views of a first embodiment of a steering wheel being manufactured by following the method according to the invention.

According to a first possibility, the method according to the invention provides for fitting, before the fixing of the strip to form the outer sheath 20, a protruding element 110, as shown in FIG. 1, so as to be able to tension the strip forming the outer sheath 20, before the seaming operation.

Taking the elements shown in FIG. 1, the manufacturing method thus comprises at least the following steps:
- overmolding the frame 11 with the overmolding material 12,
- placing the printed circuit 32 fixed on the support 10 through the lower fixing interface 33, and embedding the light sources,
- installing the electrical element and for example gluing the latter,
- installing the protruding element 110,
- fitting and attaching the strip to form the outer sheath 20.

Figure 2:
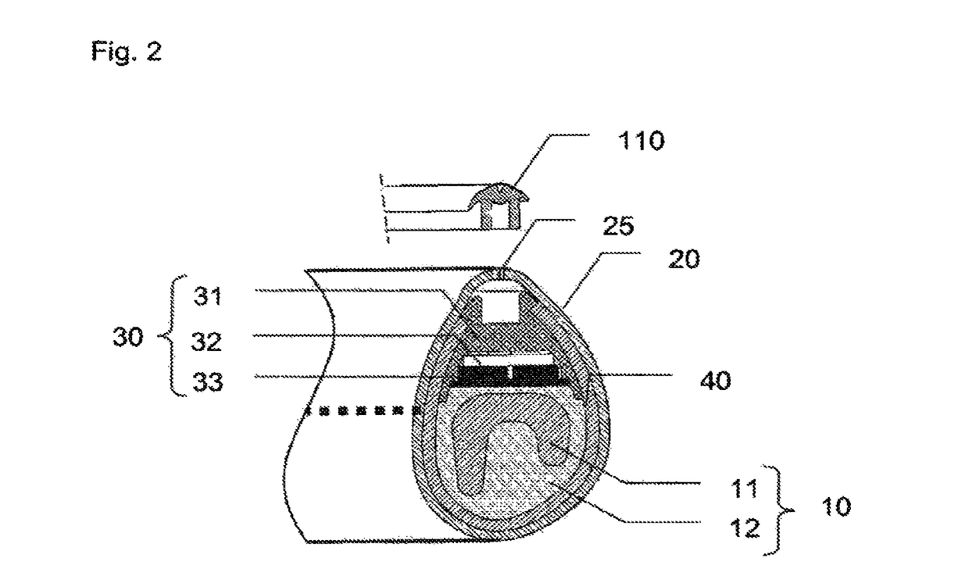

FIG. 2 shows the step consisting of forming an opening in the outer sheath 20.

According to a first option, it is possible to open a slit 25 already present in the strip to be attached around the rim and previously closed by temporary or provisional closure means (fusible seaming, chain seaming, adhesive, slide fastener or zip . . . ), so as to prevent this opening from stretching and creating wrinkles when the strip is fitted.

According to a second option, the slit 25 is cut directly into the outer sheath 20 once the latter has been fitted and attached around the rim. For this purpose, there is a groove 22 formed in element 110 which allows a cutting blade to be guided to avoid any cutting deviation. Protruding element 110 also forms a protective element.

Once the opening (slit 25) is formed, on all or part of the periphery of the rim, it is possible to remove (protective or protruding) element 110 that was underneath the outer sheath 20, as shown in FIG. 2.

Figure 3:
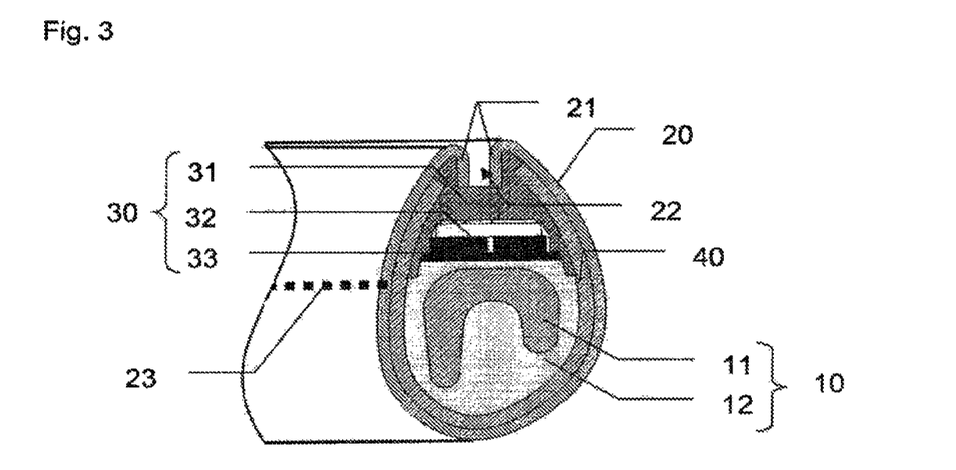

FIG. 3 shows the result of the next step, which consists of folding the overlengths towards the inside of the rim, with the flaps or flanges 21 plated and possibly glued against faces of the upper fixing interface 31. As shown in FIG. 3, a groove 22 is then defined, the upper edges of which are continuously formed by the outer sheath 20, which provides an attractive appearance, with a well-closed flange angle of less than 50° between the part of the outer sheath 20 positioned on the outer periphery of the rim, and the part flanged into the groove 22.

As shown in FIG. 4, the groove 22 can then accommodate the light guide 34, and has a neat and well-finished appearance. The installation of the protruding element 110 has had the effect of increasing the perimeter of the steering wheel rim during the seaming process, and after removal of the protruding element 110, the outer sheath has an overall length that allows for flaps or flanges 21 of substantial length D2, each greater than half the width D1 of the groove or light guide 34. In particular, the width D1 is less than or equal to 6 mm, and each flap or flange 21 has a length D2 greater than or equal to 4 mm.

According to one possible embodiment, the flaps 21 are advantageously not glued, in order to avoid glue spillage, or contact between the glue and tools or elements that need to be reused or handled. It is therefore possible to glue the outer sheath 20 to the entire periphery of the rim (in FIG. 4, this periphery is formed by the electrical device 40 and the outer part of the upper fixing interface 31), but no glue is applied/present on the faces of the groove in which the flaps 21 are folded. With regard to elements or tools that need to be reused or handled, a chemical incompatibility between the elements or tools to be reused or handled and the glue (which does not stick) can also be foreseen, so that they can be easily wiped/cleaned in case of contamination with glue. For example, the protruding element 110 or the guiding tool are made of polypropylene when the glue is a water-based glue (such as SIKA 4225 glue, which can be used with a hardener 4900 from the same supplier) or a solvent-based glue (neoprene type).

Figure 5:
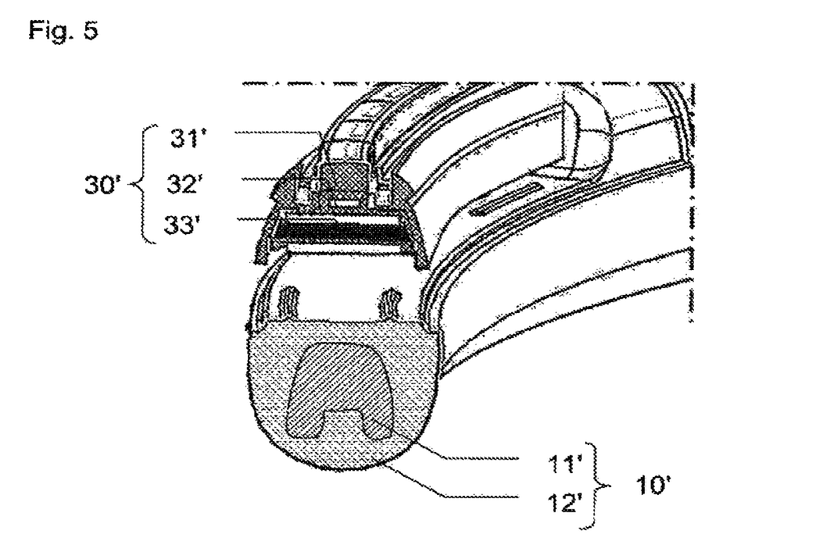
FIGS. 5 to 7 are cross sectional views of a second embodiment of a steering wheel being manufactured by following the method according to the invention.
Figure 6:
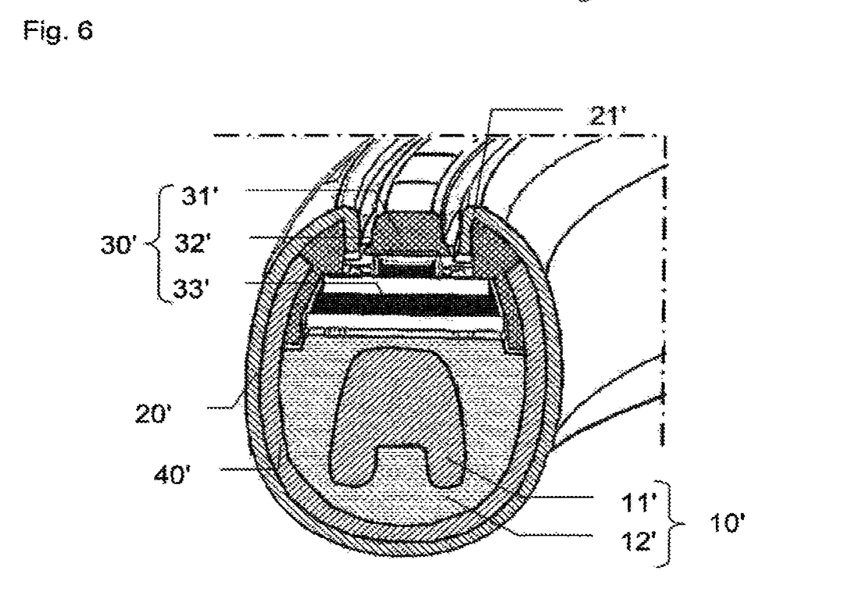
Figure 7:
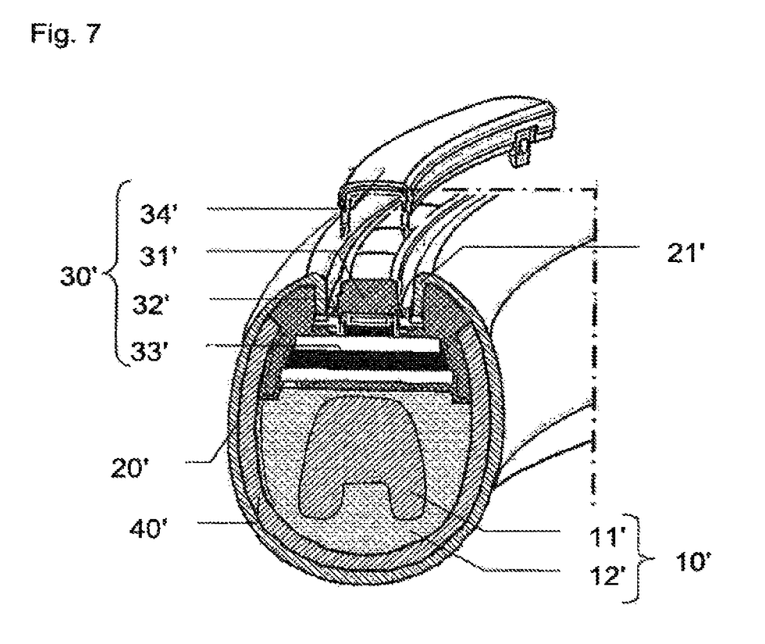

FIGS. 5 to 7 show a rim architecture with different shapes, with the rim comprising:
- a frame 11' (made of metal, such as aluminum or magnesium),
- an overmolding material 12' (polyurethane for example), overmolded around the frame 11' to form a support 10',
- an outer sheath 20' (typically made of leather, but other materials are possible), an electrical element 40' such as a heating mat or proximity sensor, a device 30' passing through the outer sheath 20', to send light signals to the driver.

Device 30' comprises an electronic circuit (a printed circuit 32' fixed on support 10', with embedded light sources (light-emitting diodes for example), a lower fixing interface 33', an upper fixing interface 31' (at least partially transparent here) and a light guide 34', as shown in FIG. 7.

Also in this case, the method according to the invention consists in fitting the outer sheath 20' in a single plain strip, without any gaping opening which could stretch and form wrinkles, in forming an opening onto the device 30' already present underneath the outer sheath 20', in order to fold over the overlengths and form flaps 21', so as to then be able to mount and attach the light guide 34', which here forms a transparent cover.

In the same way, it is possible to consider forming the opening on the strip laid flat, closing it temporarily to allow an easy seaming step, then (re)opening this opening or slit that was already present, to finalize the assembly of device 30'.

Alternatively, it is possible to consider cutting the slit or opening only when the outer sheath is fitted and attached to the rim, using a cutting tool. A guiding tool can be positioned in reference to the hub and/or the spokes of the steering wheel.

It will be understood that various modifications and/or improvements obvious to those skilled in the art may be made to the different embodiments of the invention described herein without going beyond the scope of the invention.

In particular, reference is made to a light guide arranged on the surface of the rim and passing through the outer sheath, but it is possible to consider providing a control interface, a position sensor, a biometric sensor element, and buttons which go through the outer sheath, for a steering wheel assembled according to the method of the invention.

Furthermore, it is mentioned that an opening may be formed in the outer sheath after the latter has been fitted, and the opening in question can be made along the entire length of the rim (i.e. 360° around an axis of the steering wheel, that is to say an axis of the steering column), or over part of the periphery, in a direction tangential to the steering wheel as seen from above, or in a direction tangential to the rim as seen in section. It is also possible to make several individual openings.

It is mentioned to cut a slit, but it is also possible to pierce holes, punch out parts with a cutter, or weaken an area and then tear it cleanly (by locally reducing the thickness for example).

The outer sheath can be a composite, that is to say made from several strips of the same material or of different materials (leather, synthetic, fabric, . . . ), but the invention proposes to fit it with the opening (through which the device will pass) closed during the fitting and fixing of the strip on the rim. The outer sheath may only partially cover the rim.

Finally, the opening for the device may be facing the driver to display illuminated information, but the opening may be made on a side of the rim opposite the driver, to accommodate a sensor for detecting the driver's fingers.

The invention claimed is:

1. A method for manufacturing a vehicle steering wheel, the steering wheel comprising:
    a rim,
    an outer sheath (20; 20') formed by at least one strip attached around at least part of the rim,
    the method comprising at least the steps of:
    positioning the strip around the rim,
    attaching the strip to the rim to form the outer sheath (20; 20'),
    forming an opening in the outer sheath (20; 20') facing to an internal part of a device (30; 30') within the outer sheath, wherein forming the opening comprises opening a slit previously formed in the strip and kept closed by temporary closure means fitted prior to positioning and attaching the strip around the rim,
    folding portions of the outer sheath (20; 20') surrounding the opening towards the inside of the rim to form flaps (21; 21') and provide access to the inner part of the device (30; 30').

2. The method according to claim 1, comprising, prior to the step of positioning and attaching the strip, steps consisting of forming the slit (25) in the strip laid flat and closing the slit (25) with the temporary closure means, wherein the temporary closure means comprises at least one of a slide fastener, a temporary seam, adhesive means.

3. The method according to claim 1, wherein the step consisting of attaching the strip around the rim comprises a step consisting of seaming the strip.

4. The method according to claim 1, wherein the step consisting of folding the flaps (21; 21') comprises a step consisting of attaching the flaps (21; 21') to walls of the steering wheel.

5. The method according to claim 1, wherein a portion of the device extends through the opening.

6. A method for manufacturing a vehicle steering wheel, the steering wheel comprising:
    a rim;
    an outer sheath formed by at least one strip attached around at least part of the rim;
    the method comprising at least the steps of:
    positioning the strip around the rim;
    attaching the strip to the rim to form the outer sheath;
    forming an opening in the outer sheath facing to an internal part of a device within the outer sheath, wherein forming the opening comprises cutting a slit in the outer sheath after the step of positioning and attaching the strip around the rim; and
    folding portions of the outer sheath surrounding the opening towards the inside of the rim to form flaps and provide access to the inner part of the device.

7. The method according to the claim 6, comprising a step consisting of positioning a protective element on the device (30, 30') prior to the step of positioning and attaching the strip around the rim.

8. The method according to claim 7, the protective element being a protruding element (110), wherein the step of positioning the protective element allows a rim perimeter to be temporarily increased at least during the step of positioning and attaching the strip and/or cutting the slit (25).

9. The method according to claim 7, the protective element comprising a cutting guide groove, the method comprising a step consisting of cutting the outer sheath by following the guide groove with a cutting tool.

10. The method according to claim 7, comprising a step consisting of removing the protective element, before folding the flaps (21; 21') towards the inside of the rim.

11. The method according to claim 6, comprising a step consisting of positioning a guiding tool on the steering wheel before cutting the slit (25) in the outer sheath (20; 20').

12. The method according to claim 11, comprising a step consisting of inserting a cover or screen into the previously formed opening.

13. The method according to claim 6, wherein a portion of the device extends through the opening.

\* \* \* \* \*